US012551782B2

(12) United States Patent
Cao et al.

(10) Patent No.: US 12,551,782 B2
(45) Date of Patent: Feb. 17, 2026

(54) METHOD FOR OPERATING SHOOTING-TYPE SOMATOSENSORY GAME

(71) Applicant: Shenzhen Shimi Network Technology Co., Ltd., Shenzhen (CN)

(72) Inventors: Qianfu Cao, Shenzhen (CN); Yuan Yao, Shenzhen (CN)

(73) Assignee: Shenzhen Shimi Network Technology Co., Ltd., Shenzhen (CN)

( * ) Notice: Subject to any disclaimer, the term of this patent is extended or adjusted under 35 U.S.C. 154(b) by 324 days.

(21) Appl. No.: 18/195,896

(22) Filed: May 10, 2023

(65) Prior Publication Data

US 2024/0131417 A1 Apr. 25, 2024
US 2024/0226713 A9 Jul. 11, 2024

(30) Foreign Application Priority Data

Oct. 24, 2022 (CN) ........................ 202211302452.6

(51) Int. Cl.
*A63F 13/212* (2014.01)
*A63F 13/428* (2014.01)

(52) U.S. Cl.
CPC .......... *A63F 13/212* (2014.09); *A63F 13/428* (2014.09)

(58) Field of Classification Search
None
See application file for complete search history.

(56) References Cited

U.S. PATENT DOCUMENTS

2015/0258442 A1* 9/2015 Yudo .................... A63F 13/537 463/31
2018/0043263 A1* 2/2018 Cao ........................ A63F 13/65
2024/0176483 A1* 5/2024 Peng ..................... G06F 3/0486

* cited by examiner

*Primary Examiner* — Lawrence S Galka
(74) *Attorney, Agent, or Firm* — IPro, PLLC

(57) ABSTRACT

Disclosed herein are a method, apparatus and device for operating a shooting-type somatosensory game and a computer-readable storage medium. The method for operating the shooting-type somatosensory game comprises: after a preset shooting-type somatosensory game is started, mapping an operation button on a touch display module of a paired somatosensory device, the operation button comprising a shooting button; acquiring somatosensory data and button operation data from the somatosensory device; adjusting a position of a shooting crosshair on a graphical user interface of the shooting-type somatosensory game according to the somatosensory data; and if the operation data of the shooting button is received from the somatosensory device, performing a shooting operation based on a current crosshair position. The shooting-type somatosensory game method of the present disclosure has the advantages of low cost, wide applicability, strong game operability, etc.

14 Claims, 5 Drawing Sheets

METHOD FOR OPERATING SHOOTING-TYPE SOMATOSENSORY GAME

TECHNICAL FIELD

The present disclosure relates to the technical field somatosensory games, and in particular, to a method, apparatus and device for operating a shooting-type somatosensory game, and a computer-readable storage medium.

BACKGROUND

Somatosensory games refer to games that rely on somatosensory devices to collect motion data of users, and then control game characters based on the motion data. The advantage of this game method is that a user needs to participate in motion during the game, the user has a stronger sense of participation, and it is helpful to protect the user's health.

However, a problem with traditional somatosensory games is that, because somatosensory data is used to control the motion of game characters, some non-motion-related functions, such as shooting and prop throwing, cannot be realized through somatosensory data. At present, these non-motion-related functions are usually realized by a specific somatosensory gamepad. However, using the specific gamepad not only increases the user's game cost, but also limits the temporal spontaneity and freedom of the game.

SUMMARY

Embodiments of the present disclosure provide a method for operating a shooting-type somatosensory game, which aims to reduce the game cost of the shooting-type somatosensory game while improving the playability of the shooting-type somatosensory game.

In order to achieve the above objective, the embodiments the present disclosure provide a method for operating a shooting-type somatosensory game, comprising:

after a preset shooting-type somatosensory game is started, mapping an operation button on a touch display of a paired somatosensory device, the operation button comprising a shooting button;

acquiring somatosensory data and button operation data from the somatosensory device;

adjusting a position of a shooting crosshair on a graphical user interface of the shooting-type somatosensory game according to the somatosensory data; and if the operation data of the shooting button is received from the somatosensory device, performing a shooting operation based on a current crosshair position.

In an embodiment, the operation button further comprises a reloading button, and the method further comprises:

if operation data of the reloading button is received from the somatosensory device, performing a reloading operation.

In an embodiment, the method further comprises:

according to a type of a current ammunition, changing a type of the shooting crosshair.

In an embodiment, the operation button further comprises a flight button, and the method further comprises:

if operation data of the flight button is received from the somatosensory device, performing a flight operation, wherein when the flight operation is performed, a duration of the flight operation is determined according to the somatosensory data.

In an embodiment, the operation button further comprises a double button, and the method further comprises:

if the button operation data comprises operation data of the double button, performing a countdown of double damage, wherein during the double damage, damage data of a current bullet is doubled.

In an embodiment, the operation button further comprises a prop throwing button, and the method further comprises:

if the operation button data comprises operation data of the prop throwing button, performing a prop betting operation.

In an embodiment, when the operation button is mapped on the touch display of the paired somatosensory device, the method comprises:

with a designated operation button as a center button, surrounding the remaining operation buttons around the center button.

In order to achieve the above objective, the embodiments of the present disclosure further propose an apparatus for operating a shooting-type somatosensory game, comprising:

a button mapping module configured to, after a preset shooting-type somatosensory game is started, map an operation button on a touch display of a paired somatosensory device, the operation button comprising a shooting button;

a data acquisition module configured to acquire somatosensory data and button operation data from the somatosensory device;

a crosshair adjustment module configured to adjust a position of a shooting crosshair on a graphical user interface of the shooting-type somatosensory game according to the somatosensory data; and a shooting operation module configured to, if the operation data of the shooting button is received from the somatosensory device, perform a shooting operation based on a current crosshair position.

In order to achieve the above objective, the embodiments of the present disclosure further propose a device for operating a shooting-type somatosensory game, comprising: a memory, a processor, and an operating program of a shooting-type somatosensory game that is stored on the memory and can run on the processor, wherein when the processor executes the operating program of the shooting-type somatosensory game, any one of the methods for operating the shooting-type somatosensory game described above is implemented.

In order to achieve the above objective, the embodiments of the present disclosure further propose a computer-readable storage medium, wherein an operating program of a shooting-type somatosensory game is stored on the computer-readable storage medium, and when the operating program of the shooting-type somatosensory game is executed by a processor, any one of the methods for operating the shooting-type somatosensory game described above is implemented.

According to the method for operating the shooting-type somatosensory game in the technical solution of the present disclosure, when playing a game, the shooting button is mapped on the touch display of the somatosensory device. In this way, during the game, the position of the shooting crosshair may be adjusted according to the somatosensory data, and then the shooting operation may be performed according to the somatosensory data, so that the somatosensory control and button control can be realized at the same time with conventional somatosensory devices. Therefore, even ordinary somatosensory devices, such as smart watches and smart bracelets, can be used to input button instructions, so that no specific somatosensory game device is required, which can greatly reduce the user's game cost, and improve the temporal spontaneity and freedom of the game. It can be seen that, compared with traditional shooting-type somatosensory game methods, the shooting-type somatosensory game method of the present disclosure has the advantages of low cost, wide applicability, strong game operability, etc.

BRIEF DESCRIPTION OF FIGURES

In order to more clearly illustrate the technical solutions in embodiments of the present disclosure or the prior art, the drawings needed to be used in the description of the embodiments or the prior art will be briefly described below. Obviously, the drawings in the following description are only some embodiments of the present disclosure, and other drawings can also be obtained by those of ordinary skill in the art from the structures illustrated in these drawings without any creative efforts.

Figure 1:
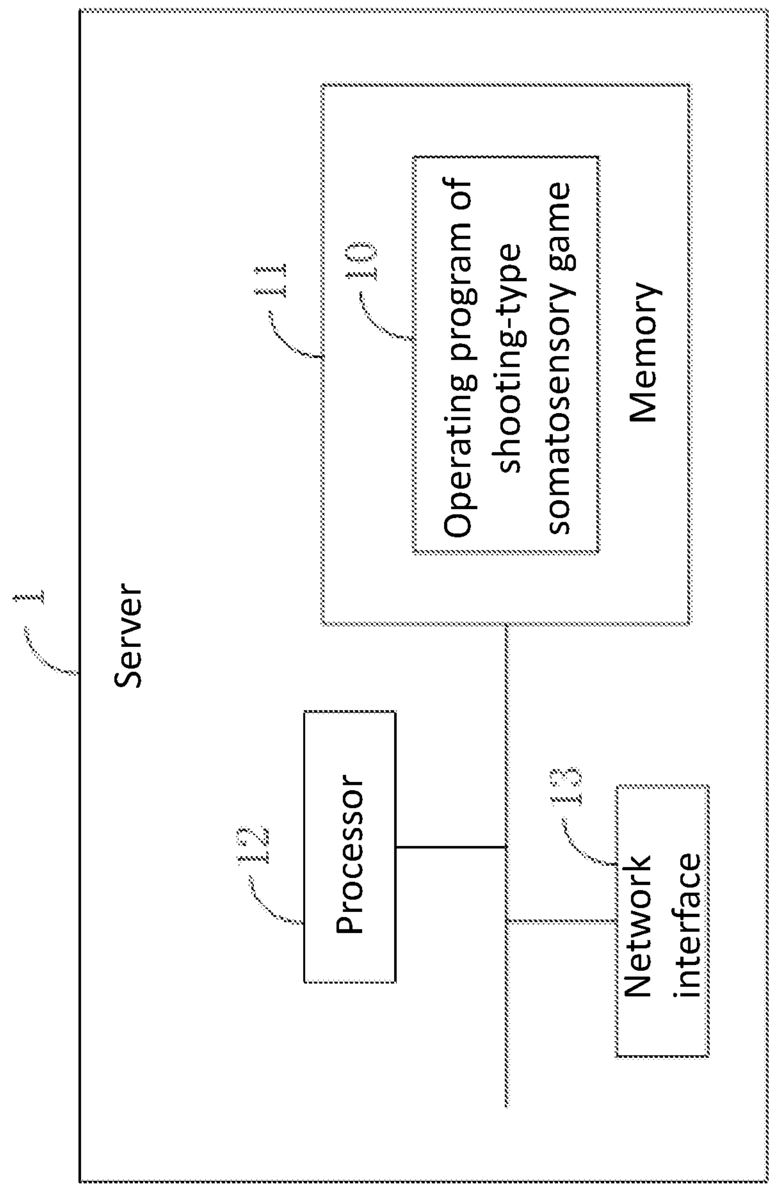
FIG. 1 is a module structural diagram of a device for operating a shooting-type somatosensory game according to an embodiment of the present disclosure.

The implementation, functional features and advantages of the objective of the present disclosure will be further described with reference to the drawings.

DETAILED DESCRIPTION

It should be understood that specific embodiments described herein are only used to explain the present disclosure and are not used to limit the present disclosure.

In order to better understand the above technical solutions, exemplary embodiments of the present disclosure will be described in more detail below with reference to the drawings. While the exemplary embodiments of the present disclosure have been shown in the drawings, it should be understood that the present disclosure may be implemented in various forms and should not be limited by the embodiments set forth herein. Rather, these embodiments are provided so that the present disclosure can be understood more thoroughly, and the scope of the present disclosure can be fully conveyed to those skilled in the art.

It should be noted that, in the claims, any reference signs placed between parentheses shall not be construed as limiting the claims. The words "comprising" or "comprises" herein do not exclude the presence of components or steps not listed in the claims. The indefinite article "a" or "an" preceding a component does not exclude the presence of a plurality of such components. The present disclosure can be implemented by means of hardware comprising several different components, and a suitably programmed computer. In a unit claim enumerating several means, several of these means can be embodied by the same item of hardware. Moreover, the use of "first," "second," and "third," etc. does not imply any order, and these words may be construed as designations.

FIG. 1 is a schematic structural diagram of a server 1 (also called a device for operating a shooting-type somatosensory game) in a hardware running environment involved in a solution of an embodiment of the present disclosure.

The server of the embodiment of the present disclosure is, for example, an "Internet of Things device", a smart air conditioner with a networking function, a smart light, a smart power supply, an AR/VR device with a networking function, a smart speaker, a self-driving car, a PC, a smart phone, a tablet computer, an e-book reader, a portable computer, or other devices with display functions.

As shown in FIG. 1, the server 1 comprises a memory 11, a processor 12 and a network interface 13.

The memory 11 comprises at least one type of readable storage medium, and the readable storage medium comprises a flash memory, a hard disk, a multimedia card, a card-type memory (e.g., an SD or DX memory, etc.), a magnetic memory, a magnetic disk, an optical disk or the like. In some embodiments, the memory 11 may be an internal storage unit of the server 1, such as a hard disk of the server 1. In other embodiments, the memory 11 may also be an external storage device of the server 1, such as a plug-in hard disk equipped on the server 1, a smart media card (SMC), a secure digital (SD) card, a flash card or the like.

Further, the memory 11 may also comprise an internal storage unit and an external storage device of the server 1. The memory 11 can not only be used to store application software and various data installed on the server 1, such as codes of an operating program 10 of the running-type somatosensory game, but also can be used to temporarily store data that has been output or will be output.

In some embodiments, the processor 12 may be a central processing unit (CPU), a controller, a microcontroller, a microprocessor or other data processing chips, and used to run program codes or processing data stored in the memory 11, such as operating program 10 for executing a shooting-type somatosensory game, etc.

The network interface 13 may optionally comprise a standard wired interface and a wireless interface (such as a WI-FI interface), and is generally used to establish communication connections between the server 1 and other electronic devices.

The network may be the Internet, a cloud network, a wireless fidelity (Wi-Fi) network, a personal network (PAN), a local area network (LAN) and/or a metropolitan area network (MAN). Various devices in a network environment may be configured to connect to a communication network according to various wired and wireless communication protocols. Examples of such wired and wireless communication protocols may include, but are not limited to, at least one of the following: Transmission Control Protocol and Internet Protocol (TCP/IP), User Datagram Protocol (UDP), Hypertext Transfer Protocol (HTTP), file transfer Protocol (FTP), ZigBee, EDGE, IEEE 802.11, Optical Fidelity (Li-Fi), 802.16, IEEE 802.11s, IEEE 802.11g, multi-hop communication, wireless access point (AP), device-to-device communication, cellular communication protocol and/or Bluetooth (Blue Tooth) communication protocol, or a combination thereof.

Optionally, the server may further comprise a user interface. The user interface may include a display and an input unit such as a keyboard. Optional user interfaces may also include standard wired interfaces and wireless interfaces.

Optionally, in some embodiments, the display may be an LED display, a liquid crystal display, a touch-sensitive liquid crystal display, an organic light-emitting diode (OLED) touch device, or the like. The display may also be referred to as a display screen or a display unit, and is used to display information processed in the server 1 and to display a visualized user interface.

FIG. 1 only shows the server 1 with components 11-13 and operating program 10 of the shooting-type somatosensory game. It can be understood by those skilled in the art that the structure shown in FIG. 1 does not form a limitation of the server 1, and may comprise fewer or more components than shown, or combinations of certain components, or different arrangements of components.

In this embodiment, the processor 12 may be used to call the operating program of the shooting-type somatosensory game stored in the memory 11, and perform the following operations:

after a preset shooting-type somatosensory game is started, displaying an operation button on a touch display of a somatosensory device, the operation button comprising a shooting button;

acquiring somatosensory data and button operation data from the somatosensory device;

adjusting a position of a shooting crosshair on a graphical user interface of the shooting-type somatosensory game according to the somatosensory data; and if the operation data of the shooting button is received from the somatosensory device, performing a shooting operation based on a current crosshair position.

In an embodiment, the processor 12 may be used to call the operating program of the shooting-type somatosensory game stored in the memory 11, and perform the following operations:

when the operation button further comprises a reloading button, if operation data of the reloading button is received from the somatosensory device, performing a reloading operation.

In an embodiment, the processor 12 may be used to call the operating program of the shooting-type somatosensory game stored in the memory 11, and perform the following operations:

according to a type of a current ammunition, replacing a type of the shooting crosshair.

In an embodiment, the processor 12 may be used to call the operating program of the shooting-type somatosensory game stored in the memory 11, and perform the following operations:

when the operation button further comprises a flight button, if operation data of the flight button is received from the somatosensory device, performing a flight operation, wherein when the flight operation is performed, a duration of the flight operation is determined according to the somatosensory data.

In an embodiment, the processor 12 may be used to call the operating program of the shooting-type somatosensory game stored in the memory 11, and perform the following operations:

when the operation button further comprises a double button, if the button operation data comprises operation data of the double button, performing a countdown of double damage, wherein during the double damage, damage data of a current bullet is doubled.

In an embodiment, the processor 12 may be used to call the operating program of the shooting-type somatosensory game stored in the memory 11, and perform the following operations:

when the operation button further comprises a prop throwing button, if the operation button data comprises operation data of the prop throwing button, performing a prop betting operation.

In an embodiment, the processor 12 may be used to call the operating program of the shooting-type somatosensory game stored in the memory 11, and perform the following operations:

when the operation button is mapped on the touch display of the paired somatosensory device, with a designated operation button as a center button, surrounding the remaining operation buttons around the center button.

Based on the hardware structure of the device for operating the shooting-type somatosensory game, an embodiment of the method for operating the shooting-type somatosensory game of the present disclosure is proposed. The method for operating the shooting-type somatosensory game of the present disclosure aims to reduce the game cost of the shooting-type somatosensory game while improving the playability of the shooting-type somatosensory game.

Figure 2:
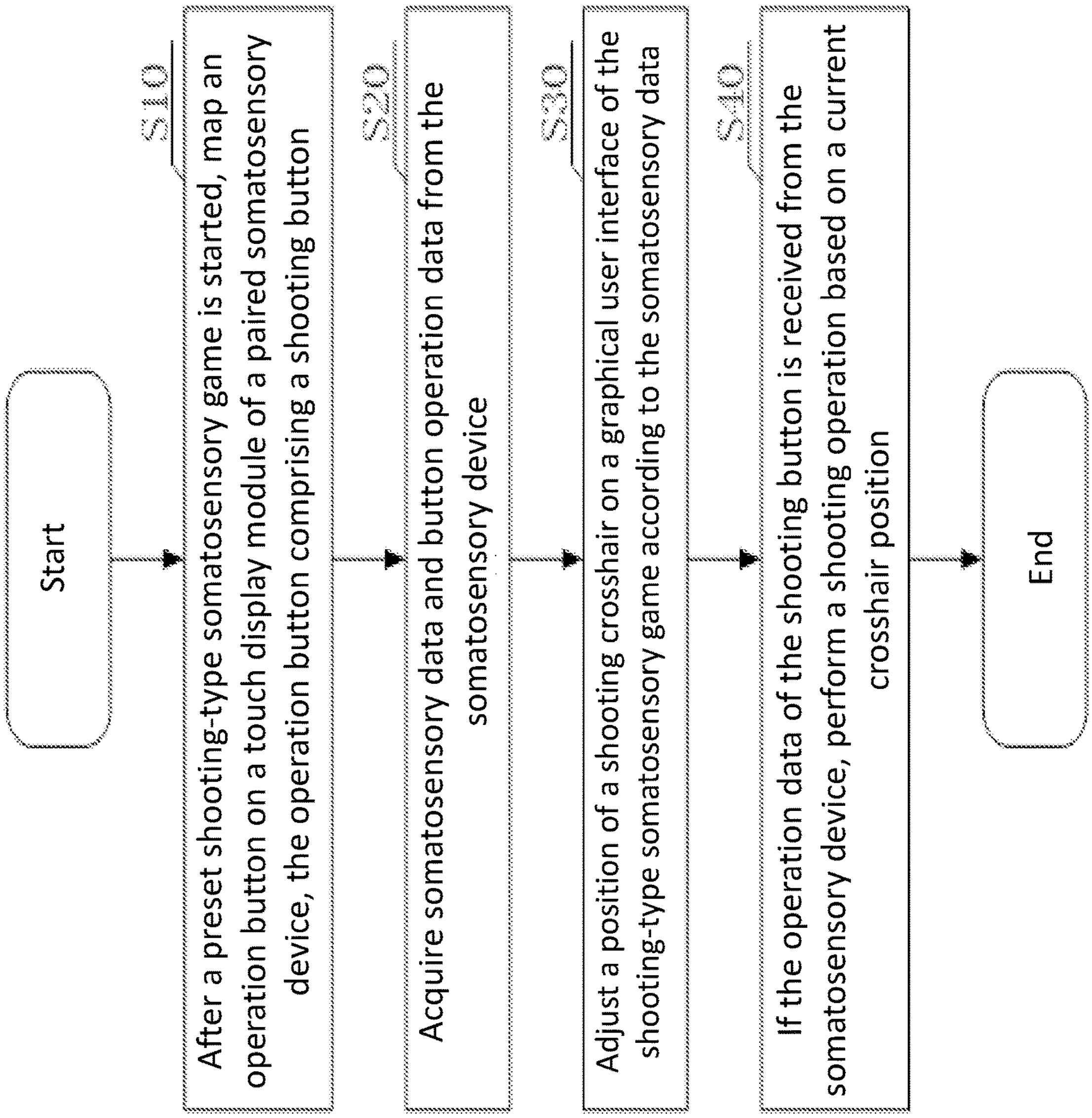
FIG. 2 is a schematic flowchart of a device for operating a shooting-type somatosensory game according to an embodiment of the present disclosure.

Referring to FIG. 2, FIG. 2 shows a method for operating the shooting-type somatosensory game according to an embodiment of the present disclosure. The method for operating the shooting-type somatosensory game comprises the following steps:

S10: After a preset shooting-type somatosensory game is started, map an operation button on a touch display of a somatosensory device, the operation button comprising a shooting button.

The shooting-type somatosensory game refers to a somatosensory game that requires a player to control a game character to shoot. It may be a local application, or may be a small program based on HTML5, a web application or the like. Specifically, the somatosensory game runs on a terminal, and the terminal may be a desktop computer, a notebook computer, a game console, a portable game console, a smart phone, a tablet computer, a smart watch, a smart TV or the like.

A somatosensory device refers to a device capable of detecting a player's somatosensory data. Generally, the somatosensory device is set to comprise a six-axis IMU sensor, and the six-axis IMU sensor comprises a three-axis accelerometer and a three-axis gyroscope. The six-axis IMU sensor detects the player's somatosensory data by detecting changes in the player's three-axis acceleration and three-axis angular velocity. Specifically, the somatosensory device is set to be wearable, and its forms include but are not limited to the following: bracelets, watches, gamepads, smart phones, etc.

Furthermore, before the game, the somatosensory device needs to establish a communication connection with a terminal (that is, establish pairing with the terminal), wherein a wired connection or a wireless connection may be established between the somatosensory device and the terminal. For example, when the somatosensory device establishes a wired connection with the terminal, it may be based on at least one of USB2.0 protocol, USB3.0 protocol, Thunderbolt 3 protocol, and Thunderbolt 4 protocol; and when the somatosensory device establishes a wireless connection with the terminal, it may be based on at least one of Bluetooth protocol, WiFi protocol, infrared protocol, 2.4G communication protocol, and NFC protocol.

Specifically, in the technical solution defined in the present disclosure, the somatosensory device needs to have a touch display to display a graphical user interface required by the game. In addition to displaying the required graphical user interface, the touch display has a touch control function, so that users can input instructions by means of touch.

The shooting button refers to a button corresponding to the shooting operation in the shooting-type somatosensory game. Through the shooting button, the user can input a shooting instruction on the somatosensory device to implement the shooting operation of the game character.

Specifically, when the user starts a shooting-type somatosensory game on the terminal, the terminal generates operation button data based on a preset operation button of the current somatosensory game, and then transmits the operation button data to the somatosensory device by means of communication. After the somatosensory device receives the operation button data, it displays a corresponding operation button on a corresponding touch display based on the operation button data. The preset operation button corresponds to a function that is difficult to achieve through somatosensory data in the somatosensory game. During the game, the users can trigger the operation buttons to achieve functions such as flying, shooting, prop throwing, etc. It is worth noting that, depending on the type of game or the content of the game, each somatosensory game is preset with a different quantity of operation buttons, and the shooting-type somatosensory game defined in the technical solution of the present disclosure is preset with a shooting button.

It can be understood that in the technical solution of the present disclosure, corresponding operation buttons are mapped on the touch display of the somatosensory device according to the somatosensory game currently running on the terminal, so that the user can use a common somatosensory device (such as a smart watch, a smart bracelet or the like) to input specific control instructions without purchasing a specific gamepad, which can thus greatly reduce the user's game cost. Moreover, since there is no need to carry a gamepad, the user can play the game at any time, thereby improving the temporal spontaneity and freedom of the game. In addition, since the virtual operation buttons are mapped on the touch display, different button operations can be adaptively mapped according to different somatosensory games, so as to adapt to various types of somatosensory games and meet different use requirements.

S20: Acquire somatosensory data and button operation data from the somatosensory device.

The somatosensory data refers to posture data of the user collected by the somatosensory device, which includes three-axis acceleration data and three-axis angular velocity data. The button operation data refers to data when the user touches and operates a button.

Furthermore, when the terminal is running the somatosensory game, the somatosensory device can continuously send the somatosensory data and the button operation data to the terminal based on a communication protocol for establishing a communication connection with the terminal and a set sampling frequency.

For example, when pairing/establishing a communication connection between the somatosensory device and the terminal via the Bluetooth protocol, the somatosensory device will send sampling data to the terminal every 20 ms (it can also be understood as the somatosensory device sending sampling data to the terminal at a frequency of 50 Hz), the sampling data including the somatosensory data and the button operation data.

S30: Adjust a position of a shooting crosshair on a graphical user interface of the shooting-type somatosensory game according to the somatosensory data.

Specifically, the graphical user interface of the shooting-type somatosensory game can be understood as a game interface when the shooting-type somatosensory game is running. The shooting crosshair is a target crosshair used to assist a user in performing a shooting operation. During the game, the game crosshair is resident on the graphical user interface of the somatosensory game, and may be adjusted according to the somatosensory data.

Specifically, after receiving the somatosensory data transmitted by the somatosensory device, the terminal can obtain the user's motion/posture trajectory according to a posture algorithm such as an Euler angle algorithm, a direction cosine method, a quaternion algorithm or the like, and then acquire a corresponding shooting crosshair position adjustment instruction according to the calculated motion/posture trajectory data. After the terminal sends the position adjustment instruction to the current shooting-type somatosensory game, the game performs a corresponding crosshair position adjustment operation.

S40: If the operation data of the shooting button is received from the somatosensory device, perform a shooting operation based on a current crosshair position.

Specifically, during the game, if the user inputs a shooting operation instruction through the shooting button on the somatosensory device, the terminal will perform the shooting operation based on the current crosshair position, so as to shoot at a position/object targeted by the current shooting crosshair.

It can be understood that according to the method for operating the shooting-type somatosensory game in the technical solution of the present disclosure, when playing a game, the shooting button is mapped on the touch display of the somatosensory device. In this way, during the game, the position of the shooting crosshair may be adjusted according to the somatosensory data, and then the shooting operation may be performed according to the somatosensory data, so that the somatosensory control and button control can be realized at the same time with conventional somatosensory devices. Therefore, even ordinary somatosensory devices, such as smart watches and smart bracelets, can be used to input button instructions, so that no specific somatosensory game device is required, which can greatly reduce the user's game cost, and improve the temporal spontaneity and freedom of the game. It can be seen that, compared with traditional shooting-type somatosensory game methods, the shooting-type somatosensory game method of the present disclosure has the advantages of low cost, wide applicability, strong game operability, etc.

In some embodiment, the operation button further comprises a reloading button, and the method further comprises:

if operation data of the reloading button is received from the somatosensory device, performing a reloading operation.

Specifically, the reloading button is a button corresponding to a reloading function, and based on the reloading button, the user can input a reloading instruction to implement the reloading operation. It is worth noting that the reloading button is not limited to changing the type of ammunition, but can also change the type of ammunition by changing the type of firearm. It can be understood that the operability of the shooting-type somatosensory game can be increased through the reloading button, and it can help to enrich the content of the game, so as to improve the playability of the game.

In some embodiments, the method further comprises:

according to a type of a current ammunition, changing a type of the shooting crosshair.

Specifically, when the terminal receives the operation data of the reloading button, it will change the type of the shooting crosshair while changing the type of ammunition, so that the shooting crosshair matches the current ammunition type. It can be understood that changing the type of shooting crosshair while changing the type of ammunition can ensure the consistency between the type of ammunition and the type of the shooting crosshair. In this way, it not only enables the user to determine the type of ammunition according to the type of the shooting crosshair and reduces the difficulty of information acquisition for the user during the game, but also increases the playability and content richness of the game. Of course, the design of the present disclosure is not limited thereto, and in other embodiments, a crosshair type may also be uniformly used to correspond to different types of ammunition.

In some embodiment, the operation button further comprises a flight button, and the method further comprises:

if operation data of the flight button is received from the somatosensory device, performing a flight operation, wherein when the flight operation is performed, a duration of the flight operation is determined according to the somatosensory data.

The flight operation refers to controlling a game character to leave a current moving road surface, so as to avoid obstacles, hostile characters and the like on the road surface.

Specifically, during the game, if the user inputs a flight operation instruction through the flight button on the somatosensory device, the terminal will perform the flight operation, so that the game character enters a flight state. When the game character enters the flight state, the terminal can adjust the duration of the current flight operation according to the somatosensory data collected by the somatosensory device. Specifically, according to the somatosensory data, the terminal can determine the exercise performance of the user in the flight state, and then adjust the duration of the current flight operation according to the exercise performance. Specifically, the better the user's exercise performance in the flight phase, the longer the duration of the current flight operation; conversely, the worse the user's exercise performance in the flight phase, the shorter the duration of the current flight operation. In this way, the duration of the flight operation can be adjusted according to the user's exercise performance. Compared with traditional games based on fixed-duration flight operations, not only the operability of the game is stronger, but also the user's sense of game participation and immersion is stronger, which is more helpful to the user's gaming experience.

Figure 3:
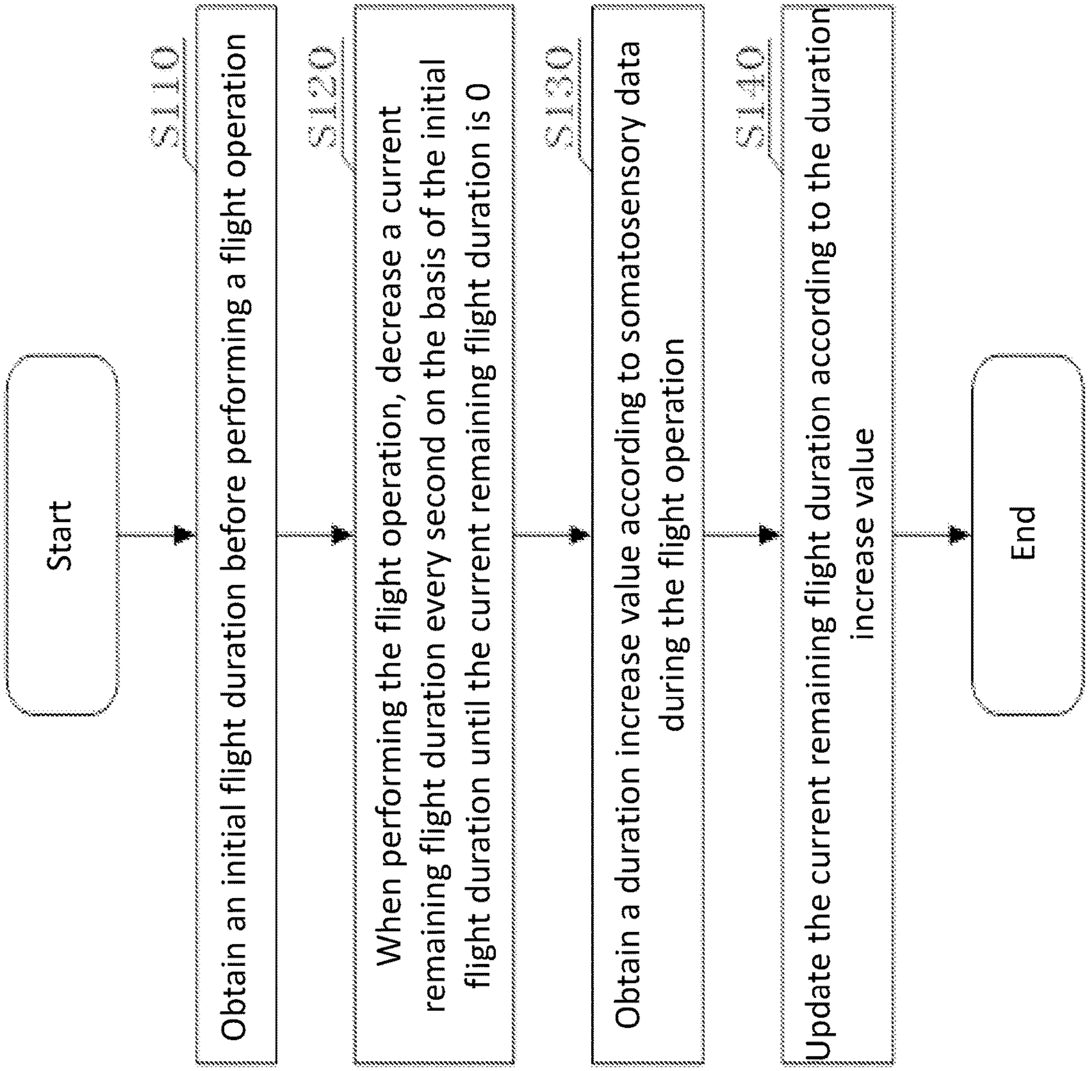
FIG. 3 is a schematic flowchart of a device for operating a shooting-type somatosensory game according to another embodiment of the present disclosure.

As shown in FIG. 3, in some embodiments, adjusting the duration of the current flight operation according to the somatosensory data comprises:

S110: Obtain an initial flight duration before performing the flight operation.

The initial flight duration refers to a preset duration used as a basic duration of the flight operation. For example, if the initial flight duration is set to 5 seconds, then the game character's duration of the flight operation is 5 seconds without the influence of the user's somatosensory data. Of course, the initial flight duration is not limited to 5 seconds, and may also be set to 2 seconds, 10 seconds, 15 seconds, etc. It is worth noting that the initial flight duration is not fixed, it can be adaptively adjusted according to a game level or a game character level.

Specifically, after the current shooting-type somatosensory game is started, the game will determine a duration of the flight operation in a current game level, and the duration is the initial flight duration. After the flight operation is started, if the flight duration ends, the flight operation also ends.

S120: When performing the flight operation, decrease the current remaining flight duration every second on the basis of the initial flight duration until the current remaining flight duration is 0.

Specifically, after the flight operation is started, the terminal will decrease the current flight duration every second, that is, when the game character enters the flight state, the flight duration will be decreased based on the initial flight duration until the current flight duration returns to 0.

S130: Obtain a duration increase value according to the somatosensory data during the flight operation.

The duration increase value refers to a value used to increase the current flight duration.

Specifically, the duration increase value can be obtained according to the somatosensory data during the flight operation, and the flight duration can be increased according to the player's game performance.

S140: Update the current remaining flight duration according to the duration increase value.

Specifically, after the duration increase value is calculated according to the somatosensory data, the corresponding duration increase value can be increased on the basis of the current remaining flight duration to obtain an updated current remaining flight duration, and the updated flight duration is an actual remaining flight duration.

It can be understood that, in this way, the duration of the flight state can be adaptively adjusted according to the user's game performance, so that the user's enthusiasm for exercise can be stimulated, helping to improve the user's sense of game immersion.

Figure 4:
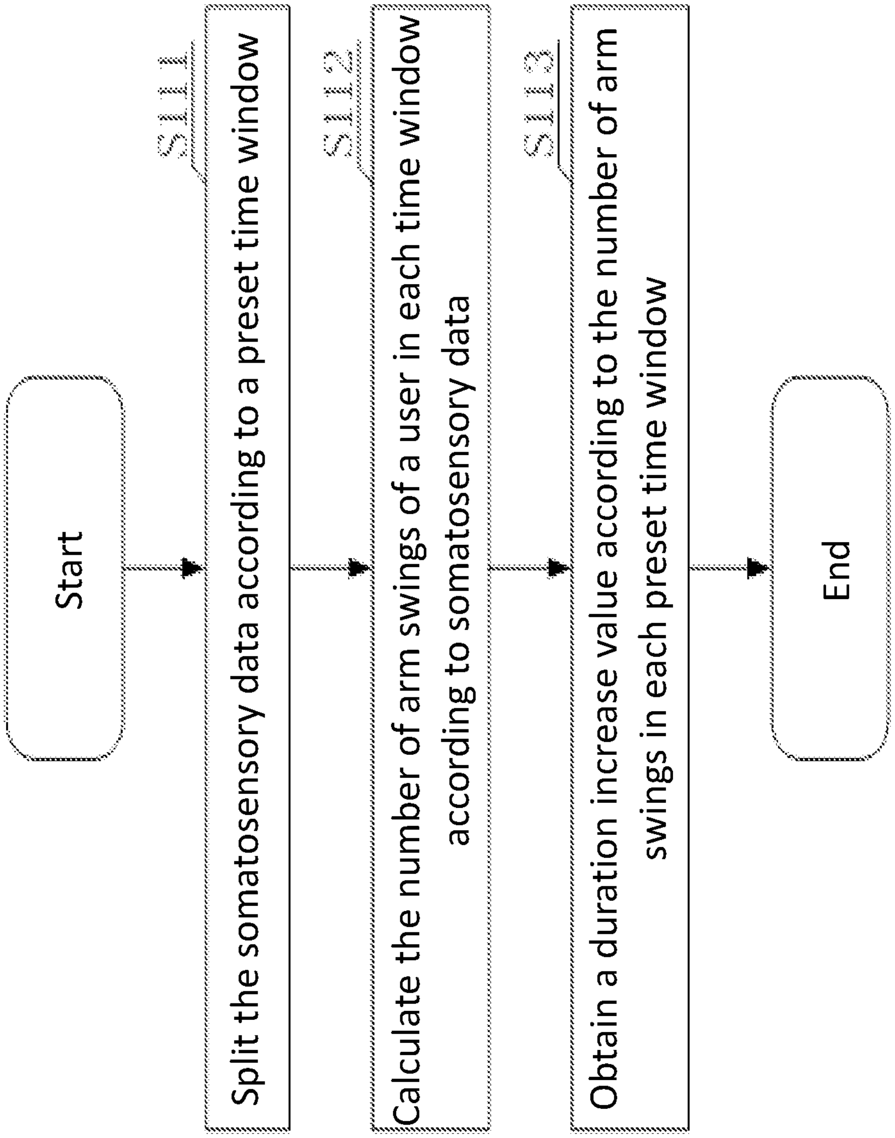
FIG. 4 is a schematic flowchart of a device for operating a shooting-type somatosensory game according to still another embodiment of the present disclosure.

As shown in FIG. 4, in some embodiments, obtaining the duration increase value according to the somatosensory data during the flight operation comprises:

S111: Split the somatosensory data according to a preset time window.

The preset time window is a window for splitting the somatosensory data during the flight operation in units of time.

Specifically, during the flight operation, when the somatosensory data transmitted by the somatosensory device meets the duration requirement of the preset time window, the terminal splits the somatosensory data once.

S112: Calculate the number of arm swings of the user in each time window according to the somatosensory data.

Specifically, since the user is required to perform an arm swing operation (including but not limited to up and down arm swings and left and right arm swings) when playing the shooting-type somatosensory game, the somatosensory data collected by the somatosensory device is motion data when the user swings his arm(s). Then, based on the somatosensory data collected by the somatosensory device, the terminal can obtain the user's movement posture through the Euler angle algorithm and other algorithms, and then by setting a threshold, the terminal can calculate the number of arm swings of the user. It is worth noting that, since the user usually only wears/uses the somatosensory device with one hand, the calculated number of arm swings is the number of swings of the user's single arm.

S113: Obtain the duration increase value according to the number of arm swings in each preset time window.

Specifically, after the number of arm swings of the user is calculated, a corresponding duration increase value may be obtained based on the number of arm swings. Specifically, the number of arm swings of the user corresponds to a set duration increase value, so that each time the user completes an arm swing action, it corresponds to a set duration increase value. In other words, the higher the user's arm swing frequency in a single time window, the more the obtained duration increase value.

It can be understood that, in this way, the flight duration increase value can be obtained based on the number of arm swings of the user, and the flight duration increase value is positively correlated with the user's arm swing frequency, so that the user's enthusiasm for exercise can be stimulated, thereby enhancing the user's sense of participation in the game.

In some embodiments, the operation buttons also comprise a damage increase button, and the method further comprises:

If operation data of the damage increase button is received from the somatosensory device, a damage increase operation is performed, and when the damage increase operation is performed, damage data of a current ammunition is increased by a preset factor.

The damage increase of ammunition refers to a damage increase of a currently used ammunition, and the preset factor refers to a factor required to increase the damage increase of the ammunition during the damage increase of the ammunition. The factor may be determined according to a current ammunition type, a current game content/level, or a game character level. In addition, the preset factor may be greater than 1 or less than 1. For example, the preset factor may be set to 0.2 times, 0.5 times, 1.5 times, 2 times, etc.

Specifically, based on the damage increase button, the user can input a doubling instruction to implement the operation of damage increase of the ammunition. It can be understood that the operability of shooting-type somatosensory games can be increased through the damage increase button, and it helps to enrich the game content to enhance the fun of the game.

In some embodiments, the operation button further comprises a prop throwing button, and the method further comprises:

- if operation data of the throwing button is received from the somatosensory device, performing a set prop throwing operation.

Specifically, the prop throwing button is a button corresponding to a prop throwing function, and based on the prop throwing button, the user can input an prop throwing instruction to implement the operation of prop throwing. It is worth noting that, in the current shooting-type somatosensory game, props that can be thrown by the prop throwing button include but are not limited to negative gain props, positive gain props, specific level pass props (such as bridges, escalators, etc.), etc. It can be understood that the operability of the shooting-type somatosensory game can be increased by using the prop throwing button, and it can help to enrich the content of the game, so as to enhance the fun of the game.

In some embodiment, when the operation button is mapped on the touch display of the paired somatosensory device, the method comprises:

- with a designated operation button as a center button, surrounding the remaining operation buttons around the center button.

Specifically, in some exemplary embodiments, when the operation button of the shooting-type somatosensory game is mapped on the touch display of the somatosensory device, with the shooting button as the center, the reloading button, the damage increase button, the flight button and the prop throwing button surround the perimeter of the shooting button. The shooting button is a designated center button. Of course, in other embodiments, other operation buttons may also be designated as the center button. It is worth noting that the designation of the center button may be preset in the game, or may be customized according to user instructions.

It can be understood that, through the layout of the above operation buttons, not only can the display region of the touch display be used more reasonably, but also the commonly used or critical operation buttons can be arranged in the center of the touch display, which is convenient for the user to operate.

Figure 5:
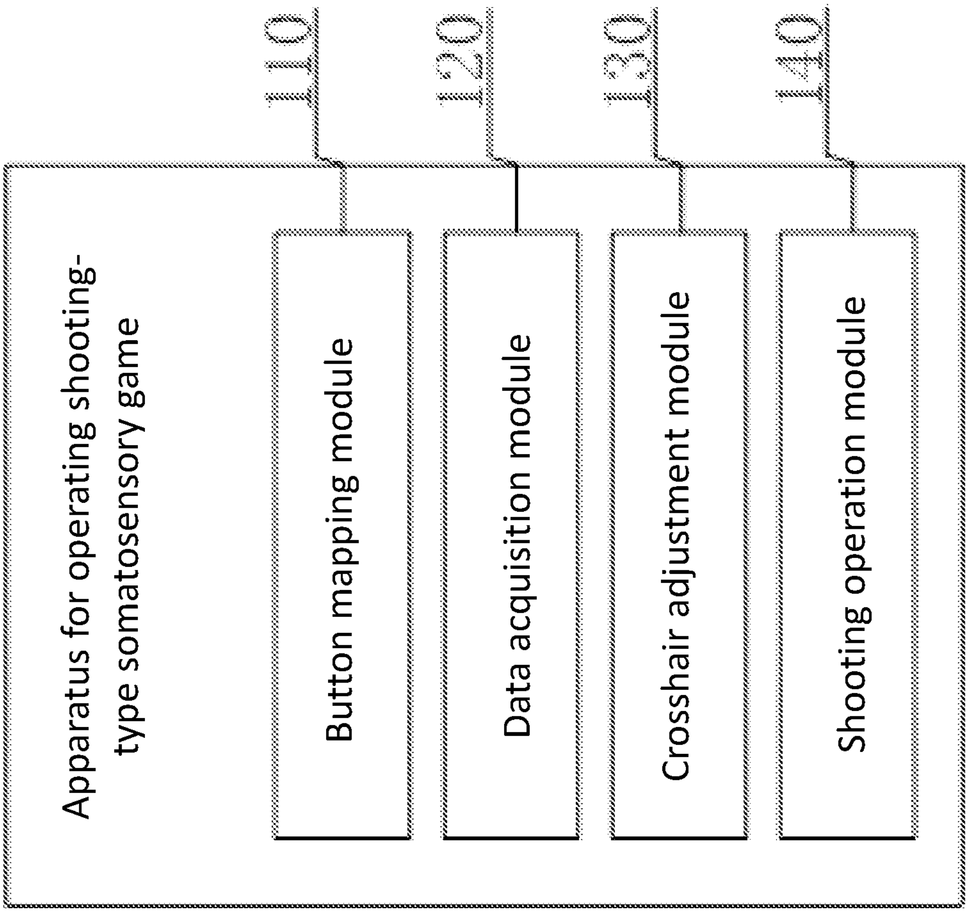
FIG. 5 is a module structural diagram of an apparatus for operating a shooting-type somatosensory game according to an embodiment of the present disclosure.

In addition, referring to FIG. 5, an embodiment of the present disclosure also proposes an apparatus for operating a shooting-type somatosensory game, and the apparatus for operating the shooting-type somatosensory game comprises:

- a button mapping module 110 configured to, after a preset shooting-type somatosensory game is started, map an operation button on a touch display of a paired somatosensory device, the operation button comprising a shooting button;
- a data acquisition module 120 configured to acquire somatosensory data and button operation data from the somatosensory device;
- a crosshair adjustment module 130 configured to adjust a position of a shooting crosshair on a graphical user interface of the shooting-type somatosensory game according to the somatosensory data; and
- a shooting operation module 140 configured to, if the operation data of the shooting button is received from the somatosensory device, perform a shooting operation based on a current crosshair position.

For the steps implemented by functional modules of the apparatus for operating the shooting-type somatosensory game, reference may be made to the various embodiments of the method for operating the shooting-type somatosensory game of the present disclosure, and they will not be repeated here.

In addition, an embodiment of the present disclosure also proposes a computer-readable storage medium, which may be any one of or any combination of a hard disk, a multimedia card, an SD card, a flash memory card, an SMC, a read-only memory (ROM), an erasable programmable read-only memory (EPROM), a portable compact disk read-only memory (CD-ROM), a USB memory, etc. The computer-readable storage medium comprises the operating program 10 of the shooting-type somatosensory game. Specific implementations of the computer-readable storage medium of the present disclosure are substantially the same as those of the above method for operating the shooting-type somatosensory game and the server 1, and they will not be repeated here.

It should be understood by those skilled in the art that the embodiments of the present disclosure may be provided as methods, systems, or computer program products. Therefore, the present disclosure can take the form of an entirely hardware embodiment, an entirely software embodiment, or an embodiment combining software and hardware aspects. Furthermore, the present disclosure may take the form of a computer program product embodied on one or more computer-usable storage media (including but not limited to disk storage, CD-ROM, optical storage, etc.) having computer-usable program code embodied therein.

The present disclosure is described with reference to flowcharts and/or block diagrams of methods, devices (systems), and computer program products according to embodiments of the disclosure. It should be understood that each procedure and/or block in the flowcharts and/or block diagrams, and combinations of procedures and/or blocks in the flowcharts and/or block diagrams can be implemented by computer program instructions. These computer program instructions may be supplied to a general purpose computer, a special purpose computer, an embedded processor, or a processor of other programmable data processing equipment to produce a machine, so that the instructions executed by the computer or the processor of other programmable data processing equipment produce means for implementing the function(s) specified in one or more steps of the flowcharts and/or one or more blocks of the block diagrams.

These computer program instructions may also be stored in a computer-readable memory capable of directing a computer or other programmable data processing equipment to operate in a specific manner, so that the instructions stored in the computer-readable memory produce an article of manufacture comprising instruction means. The instruction means implement the function(s) specified in one or more procedures of the flowcharts and/or one or more blocks of the block diagrams.

These computer program instructions may also be loaded onto a computer or other programmable data processing equipment, causing a series of operation steps to be performed on the computer or other programmable equipment to produce a computer-implemented process, so that the instructions executed on the computer or other programmable equipment provide steps for implementing the function(s) specified in one or more procedures of the flowcharts and/or one or more blocks of the block diagrams.

While preferred embodiments of the present disclosure have been described, additional changes and modifications to these embodiments can be made by those skilled in the art once they are aware of basic inventive concepts. Therefore, it is intended that the appended claims be construed to cover the preferred embodiment as well as all changes and modifications which fall within the scope of the present disclosure.

Obviously, those skilled in the art can make various changes and modifications to the present disclosure without departing from the spirit and scope of the present disclosure. Thus, if these modifications and variations of the present disclosure fall within the scope of the claims of the present disclosure and equivalent technologies thereof, the present disclosure is also intended to comprise these modifications and variations.

What is claimed is:

1. A method, comprising:

showing an operation button on a touch display of a somatosensory device, the operation button comprising a shooting button;

acquiring somatosensory data and button operation data from the somatosensory device;

adjusting a position of a crosshair on the touch display based on the somatosensory data; and in response to the button operation data indicating that the shooting button is operated, performing a shooting operation based on a current crosshair position of the crosshair;

wherein the operation button further comprises a flight button, and the method further comprises:

in response to the button operation data indicating that the flight button is operated, performing a flight operation, and determining a duration of the flight operation according to the somatosensory data.

2. The method of claim 1, wherein the operation button further comprises a reloading button, and the method further comprises:

in response to the button operation data indicating that the reloading button is operated, performing a reloading operation.

3. The method of claim 2, further comprising:

according to a type of a current ammunition, changing an appearance of the shooting crosshair.

4. The method of claim 1, wherein the operation button further comprises a double button, and the method further comprises:

in response to the button operation data indicating that the double button is operated, performing a countdown of double damage, wherein during the double damage, damage data of a current bullet is doubled.

5. The method of claim 1, wherein the operation button further comprises a prop throwing button, and the method further comprises:

in response to the button operation data indicating that the prop throwing button is operated, performing a prop betting operation.

6. The method of claim 1, wherein the operation button comprises a center button and additional buttons surrounding the center button.

7. A non-transitory computer-readable storage medium having instructions recorded thereon, the instructions when executed by a computer implementing the method of claim 1.

8. A computer system comprising the non-transitory computer-readable storage medium of claim 7, a processor and the somatosensory device.

9. A method, comprising:

showing an operation button on a touch display of a somatosensory device, the operation button comprising a shooting button;

acquiring somatosensory data and button operation data from the somatosensory device;

adjusting a position of a crosshair on the touch display based on the somatosensory data; and in response to the button operation data indicating that the shooting button is operated, performing a shooting operation based on a current crosshair position of the crosshair;

wherein the operation button further comprises a prop throwing button, and the method further comprises:

in response to the button operation data indicating that the prop throwing button is operated, performing a prop betting operation.

10. The method of claim 9, wherein the operation button further comprises a reloading button, and the method further comprises:

in response to the button operation data indicating that the reloading button is operated, performing a reloading operation.

11. The method of claim 10, further comprising:

according to a type of a current ammunition, changing an appearance of the shooting crosshair.

12. The method of claim 9, wherein the operation button comprises a center button and additional buttons surrounding the center button.

13. A non-transitory computer-readable storage medium having instructions recorded thereon, the instructions when executed by a computer implementing the method of claim 9.

14. A computer system comprising the non-transitory computer-readable storage medium of claim 13, a processor and the somatosensory device.

* * * * *